(12) United States Patent
Das

(10) Patent No.: US 7,421,484 B2
(45) Date of Patent: Sep. 2, 2008

(54) AUTOMATED BULK CONFIGURATION OF NETWORK DEVICES

(75) Inventor: Debashis Das, Billerica, MA (US)

(73) Assignee: NOKIA, Inc., Irving, TX (US)

( * ) Notice: Subject to any disclaimer, the term of this patent is extended or adjusted under 35 U.S.C. 154(b) by 99 days.

(21) Appl. No.: 11/319,629

(22) Filed: Dec. 29, 2005

(65) Prior Publication Data

US 2006/0168158 A1    Jul. 27, 2006

Related U.S. Application Data

(63) Continuation of application No. 10/323,764, filed on Dec. 20, 2002, now Pat. No. 7,013,331.

(51) Int. Cl.
*G06F 15/177* (2006.01)
(52) U.S. Cl. .................. 709/220; 709/221; 709/227
(58) Field of Classification Search ......... 709/220–224, 709/227–228
See application file for complete search history.

(56) References Cited

U.S. PATENT DOCUMENTS

| | | | |
|---|---|---|---|
| 5,838,907 A * | 11/1998 | Hansen ...................... 709/220 |
| 5,889,470 A | 3/1999 | Kaycee et al. |
| 6,026,438 A | 2/2000 | Piazza et al. |
| 6,041,347 A | 3/2000 | Harsham et al. |
| 6,055,314 A | 4/2000 | Spies et al. |
| 6,081,517 A | 6/2000 | Liu et al. |
| 6,098,098 A | 8/2000 | Sandahl et al. |
| 6,141,752 A | 10/2000 | Dancs et al. |
| 6,192,436 B1 | 2/2001 | Jacobson et al. |
| 6,343,287 B1 | 1/2002 | Kumar et al. |
| 6,446,071 B1 | 9/2002 | Callaway et al. |
| 6,449,715 B1 | 9/2002 | Krivoshein |
| 6,493,751 B1 * | 12/2002 | Tate et al. ................... 709/221 |
| 6,542,515 B1 | 4/2003 | Kumar et al. |
| 6,567,849 B2 * | 5/2003 | Ludovici et al. ............ 709/223 |
| 6,611,876 B1 | 8/2003 | Barrett et al. |
| 6,701,358 B1 * | 3/2004 | Poisson et al. .............. 709/223 |
| 6,721,880 B1 | 4/2004 | Pike |
| 6,754,731 B2 | 6/2004 | Gargi et al. |
| 6,983,362 B1 * | 1/2006 | Kidder et al. .................. 713/1 |
| 2002/0002607 A1 * | 1/2002 | Ludovici et al. ............ 709/223 |
| 2002/0124090 A1 | 9/2002 | Poier et al. |

(Continued)

FOREIGN PATENT DOCUMENTS

EP    1 059 791 A2    12/2000

(Continued)

OTHER PUBLICATIONS

Printout of pages and transcription of audio portion from CD titled "Nokia Horizon Manager v 1.2 Streamlining Network Management 'Free Entry Offer'"; date of first publication unknown, but prior to Dec. 20, 2002.

(Continued)

*Primary Examiner*—Phuoc H Nguyen
(74) *Attorney, Agent, or Firm*—Banner & Witcoff, Ltd.

(57) ABSTRACT

Multiple devices within a data communication network can be configured according to a single configuration profile. Configuration profile data is stored in a configuration file. Connections are made to individual devices, and the data in the configuration file is transformed into device-specific commands.

28 Claims, 11 Drawing Sheets

U.S. PATENT DOCUMENTS

| | | | |
|---|---|---|---|
| 2002/0161888 A1 | 10/2002 | McGuire | |
| 2002/0178239 A1* | 11/2002 | Kinyon et al. | 709/220 |
| 2003/0005088 A1* | 1/2003 | Remer | 709/220 |
| 2003/0041136 A1* | 2/2003 | Cheline et al. | 709/223 |
| 2003/0055932 A1* | 3/2003 | Brisse | 709/223 |
| 2003/0101247 A1* | 5/2003 | Kumbalimutt et al. | 709/221 |
| 2003/0225867 A1* | 12/2003 | Wedlake | 709/222 |
| 2004/0088403 A1* | 5/2004 | Aggarwal | 709/224 |

FOREIGN PATENT DOCUMENTS

| | | |
|---|---|---|
| WO | WO 98/57474 | 12/1998 |
| WO | 02078290 | 10/2002 |
| WO | WO 02080515 A1 | 10/2002 |

OTHER PUBLICATIONS

XP-002204867 Paradyne "Hotwire 8800 digital subscriber line access multiplexer (DSLAM) Installation Guide," Jun. 1998.

Written Opinion of PCT/IB03/06047.

\* cited by examiner

```
<config> ← 24
<configName>Standard Config</configName> ← 26
<configDescription>This is the standard Configuration for Example Company, Inc. ⎫
Firewalls.</configDescription>                                                   ⎬ ← 28
<deviceType>Nokia Security Platform (IPxxx)</deviceType> ← 30
<commonConfig name="Common Configuration"> ← 32
    <platform name="OS-3.5-0.0-0.0" versionTag="3.5" UpgradeOSIfRequired="true" selectable="true" ⎫
selected="true">                                                                                  ⎬ ← 34
    <configItem name="DNS Configuration" selectable="true" selected="true">        ⎫
        <configItem name="Domain Name" ServerAddress="examplecompany.com"/>        ⎪
        <configItem name="Primary Name Server" ServerAddress="xxx.xxx.xxx.xxx"/>   ⎬ ← 36
        <configItem name="Secondary Name Server" ServerAddress="yyy.yyy.yyy.yyy"/> ⎪
    </configItem>                                                                  ⎭
```

FIG. 2B

```
        <configItem name="System Failure Notification" Enable="true"
email="jones@examplecompany.com" selectable="true" selected="true"/>       ⎫
                                                                           ⎬ 38
        <configItem name="Local Time" Timezone="U.S.A./New York/New York" selectable="true"
selected="true"/>                                                          ⎫ 40
                                                                           ⎭
        <configItem name="System Logging" ServerAddress="zzzz.zzzz.zzz.zzz" Enabled="true"  ⎫
SecurityLevel="Alert" selectable="true" selected="true"/>                  ⎬ 42
                                                                           ⎭
    . . .
        <configItem name="Network Access" FTPAccess="true" FTPPortNumber="xx" TFTPAccess="false"  ⎫
TelnetAccess="true" AdminNetworkLogin="true" . . ./>                       ⎬ 44
                                                                           ⎭
    </configItem>
  . . .
</platform>
```

FIG. 2C

```
...
    <installedApplication name="AppName" selectable="true" selected="true" Enabled="true">
        <configItem name="AppName Config" Parameter1="true" />
    </installedApplication>
    ...
</commonConfig>
<configActions>
    <fileTransferAction>
        <uploadFile serverFile="C:\\****\\********" deviceFile="/***/***" 
         md5CheckSum="********************"/>
    ...
    <scriptAction>
        <runScript scriptName="C:\\****\\*********.sh" parameters="********" 
         md5CheckSum="********************"/>
    ...
    </scriptAction>
</configActions>
</config>
```

AUTOMATED BULK CONFIGURATION OF NETWORK DEVICES

CROSS-REFERENCE TO RELATED APPLICATIONS

This application is a continuation of U.S. patent application Ser. No. 10/323,764, titled "Automated Bulk Configuration of Network Devices" and filed on Dec. 20, 2002, which application is incorporated by reference herein.

FIELD OF THE INVENTION

This invention relates to automated configuration of multiple devices within a computer network.

BACKGROUND OF THE INVENTION

The growth of the Internet and other networks has encouraged many businesses to connect multiple facilities to exchange data. These facilities are often quite numerous, and may be dispersed across large geographic areas. In turn, this typically requires installation of numerous gateways, routers, switches and other network control devices to route and/or control transmission of data among the various facilities. These devices may also perform important security functions. As but one example, some devices may act as firewalls to prevent unauthorized access to a business' computer network. Other devices may also (or alternatively) provide a Virtual Private Network (VPN) between facilities so as to prevent unauthorized access to communications between facilities. Some devices may act as proxy servers and provide access to the network, the Internet and to other networks for multiple individual work stations. Some devices may be configured to limit the types of network access available to a particular work station or group of workstations. Numerous routing, access control, security and other functions may also be performed.

The operation of each network control device is typically governed by operating system and application software that is stored on and executed by the device. These software (operating systems and applications) usually have a large number of configurable parameters which must be set to specific values for desired operation of the network device. Many of these parameter settings are often the same for a large group of devices in a network. Examples include server addresses, access policies, file transfer size restrictions, local time to be used, various procedures to follow in fault conditions, alarms to transmit, etc. Setting these parameters typically requires opening a connection with each device and using the Command Line Interface (CLI) or other command shell that allows entry of commands. Various commands are then issued to and executed by the device to set the software parameters. The form and syntax of those commands usually depends upon the version of the operating system or application software that is running on the device.

Remotely configuring numerous network control devices presents various problems for network management personnel. In large deployments of new devices, one or two of the devices are often taken to a laboratory or other facility and experimented upon to determine a standard configuration for the device. The software required for that configuration, as well as parameters for that software, are then noted. The remaining new devices are then physically placed in the network. From one or more remote locations, network personnel individually access each new device over the network and enter device-specific commands to configure the device in conformity with the standard configuration. This process is labor-intensive, time-consuming and expensive. Moreover, device-by-device configuration by a human operator generally requires tedious and repetitive command entry, and is subject to human error.

These problems may be more acute when reconfiguring multiple devices already installed within a network. For example, all devices in a group of network control devices may not be physically homogeneous. Devices may use different versions of operating system and/or application software. When it is necessary to reconfigure or adjust the configuration of the devices within the group, different software on the devices may require different settings and/or different commands to change the settings. This further complicates the task of network management personnel. In addition to accessing and configuring each individual device, the personnel must also identify the specific software that the device operates, as well as any other relevant device-specific information that could affect how the device is accessed and/or configured. The network personnel must then maintain a separate set of configuration data and/or instructions for each device/software combination, and must use the correct data and/or instruction set for each device. This additional complication can make the task even more time-consuming, expensive and error-prone.

SUMMARY OF THE INVENTION

The present invention allows automatic and remote configuration of multiple network control devices according to a desired configuration profile. Deploying a given configuration profile may include any of setting software parameters, enabling or disabling software, installing new software, and un-installing existing software. A configuration profile is provided, and has configuration data applicable to multiple network control devices. Connections are established to those devices. Identifying information may be obtained from each device, which may then be used to identify an appropriate configuration deployment routine set. Once identified, the routine set is used to convert configuration data from the configuration profile into device-specific commands for each device. The configuration commands are then transmitted to the devices. In some embodiments, the commands can be transmitted one at a time, and an acknowledgement and/or confirmation obtained that the configuration command has been properly executed by the device. In other embodiments, the configuration commands can be in script or batch form. In some embodiments, the configuration profile is stored in Extensible Markup Language (XML) format or other markup language format.

DETAILED DESCRIPTION OF THE INVENTION

The present invention allows automated configuration of a group of network control devices. As used herein, "network control device" (or simply "device") includes gateways, routers, switches, bridges, proxy servers and other physical devices located within a network that route or allow communications between other points within the network. Those other points may be individual workstations, client computers communicating with a host computer (or vice versa), other network control devices, an external (to the network) computer attempting to access a computer within the network, or any other component or collection of components capable of data communication. The present invention is described by reference to an embodiment employing a specific data format (Extensible Markup Language, or XML) and programming language (the Java® programming language from Sun Microsystems, Inc. of Santa Clara, Calif.). However, any data format, programming language, hardware or software identified is only by way of example, and not intended as a limitation unless specifically recited as such in a claim. The invention could be implemented using other data formats, programming languages, hardware and software.

Figure 1:
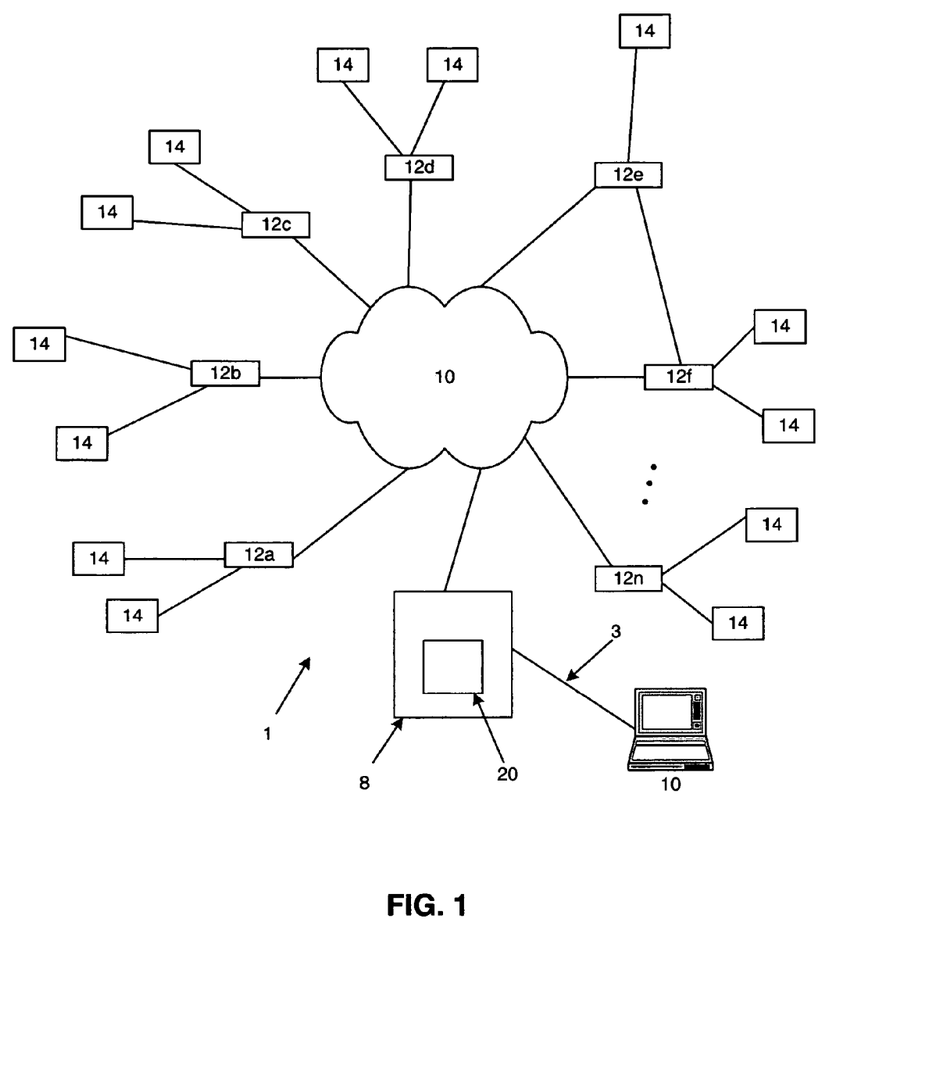
FIG. 1 is a block diagram of an example network and a collection of network control devices in which the present invention may be implemented.

FIG. 1 is a block diagram showing an example of multiple network control devices dispersed throughout a data communication network 1. Network cloud 10 may be the Internet, may be one or more interconnected Wide Area Networks and/or Local Area Networks, or may be any other data communication network. Connected to and communicating through network 10 are numerous network control devices 12, individually identified with reference numbers 12a, 12b, 12c, 12d, 12e, 12f and 12n. Devices 12 may be firewalls, gateways, routers, switches, bridges, proxy servers or other devices. Communicating through each device 12 are a number of remote points 14. Remote points 14 may be client computers in communication with one or more central hosts or with other clients; sales terminals or other computers having a more limited functionality; database or other servers; or any other component or collection of components capable of data communication. Some devices 12 may connect remote points 14 through network 10 with other devices 12 and other points within the network, while some devices 12 may connect directly to other devices 12.

Also shown in FIG. 1 is a host computer 8. Host computer 8 communicates with devices 12, and contains management software 20 for monitoring and/or otherwise controlling devices 12. Host computer 8 may further monitor and/or control other aspects of operating network 1. Host 8 may perform other functions in addition to management of devices 12, and indeed may perform functions unrelated to network management. There may be multiple host computers 8 within a network, and the management functions of host 8 may be distributed across multiple computers. Accessing host computer 8 is a management client 10, which may be a separate computer workstation. As one example, management client 10 may represent a portable or desktop computer used by a network administrator to log onto host computer 8 via a local area network connection 3. Alternatively, management client 10 may be more distant from the host 8 (e.g., operating as one of the remote points 14). Management client 10 and host computer 8 might also be combined into a single computer.

Figure 2A:
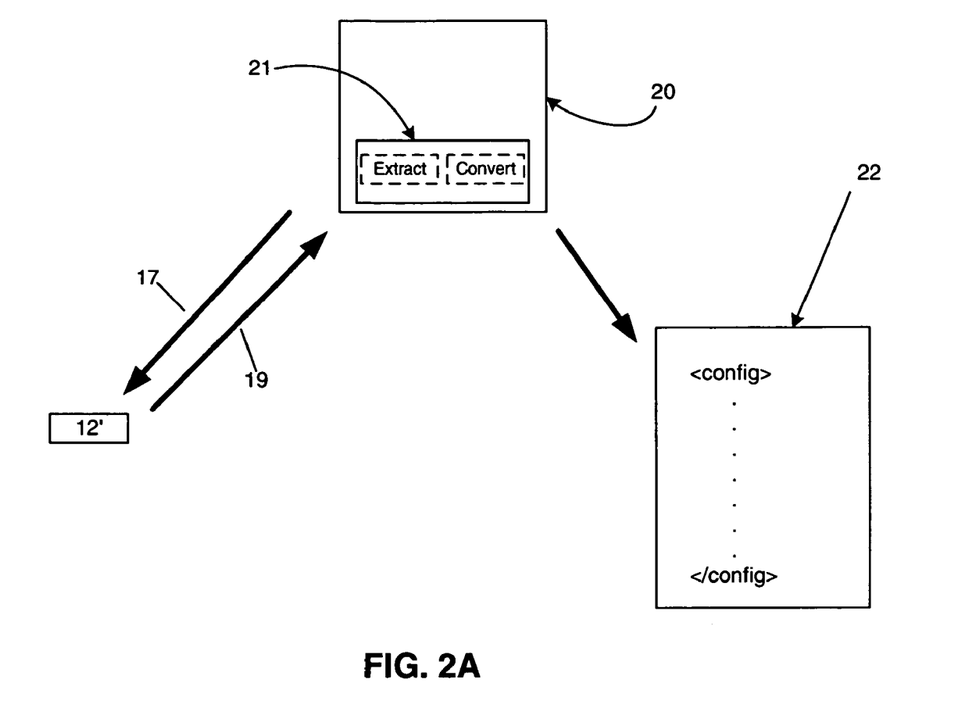
FIG. 2A is a block diagram illustrating extraction of device configuration data and writing the data to an XML configuration file according to one embodiment of the invention.

FIG. 2A shows one control device 12', which is similar to devices 12 in FIG. 1, and which may be used to configure other devices in network 1. Various software is loaded onto device 12' to achieve desired functionality, and various parameters of that software are set. This configuration of device 12' may be determined through experimentation, internal corporate policies, system requirements, and/or other factors, and is designated as a standard configuration profile that will be used for similar devices in network 1. Data for this configuration profile is then extracted, using configuration extraction software 21, and converted to configuration file 22. In a preferred embodiment, configuration file 22 is in Extensible Markup Language (XML) format. As shown in FIG. 2A, extraction software 21 may be part of network management software 20, although the extraction and conversion functions could also be performed by one or more separate software programs. In one preferred embodiment, extraction software 21 establishes a local or network connection with device 12'. Device 12' then provides a Command Line Interface (CLI) or other command shell through which specific commands can be provided to the device, and in response to which device 12' provides requested information about its software and software settings. Extraction software 21 may issue a series of such commands (represented by arrow 17), in response to which device 12' provides configuration data (represented by arrow 19). Extraction software 21 then converts the configuration data into XML format and stores the data as configuration file 22. In one preferred embodiment, extraction software 21 includes one or more Java® classes with appropriate "get" methods for automatically extracting configuration data.

Figure 2B:
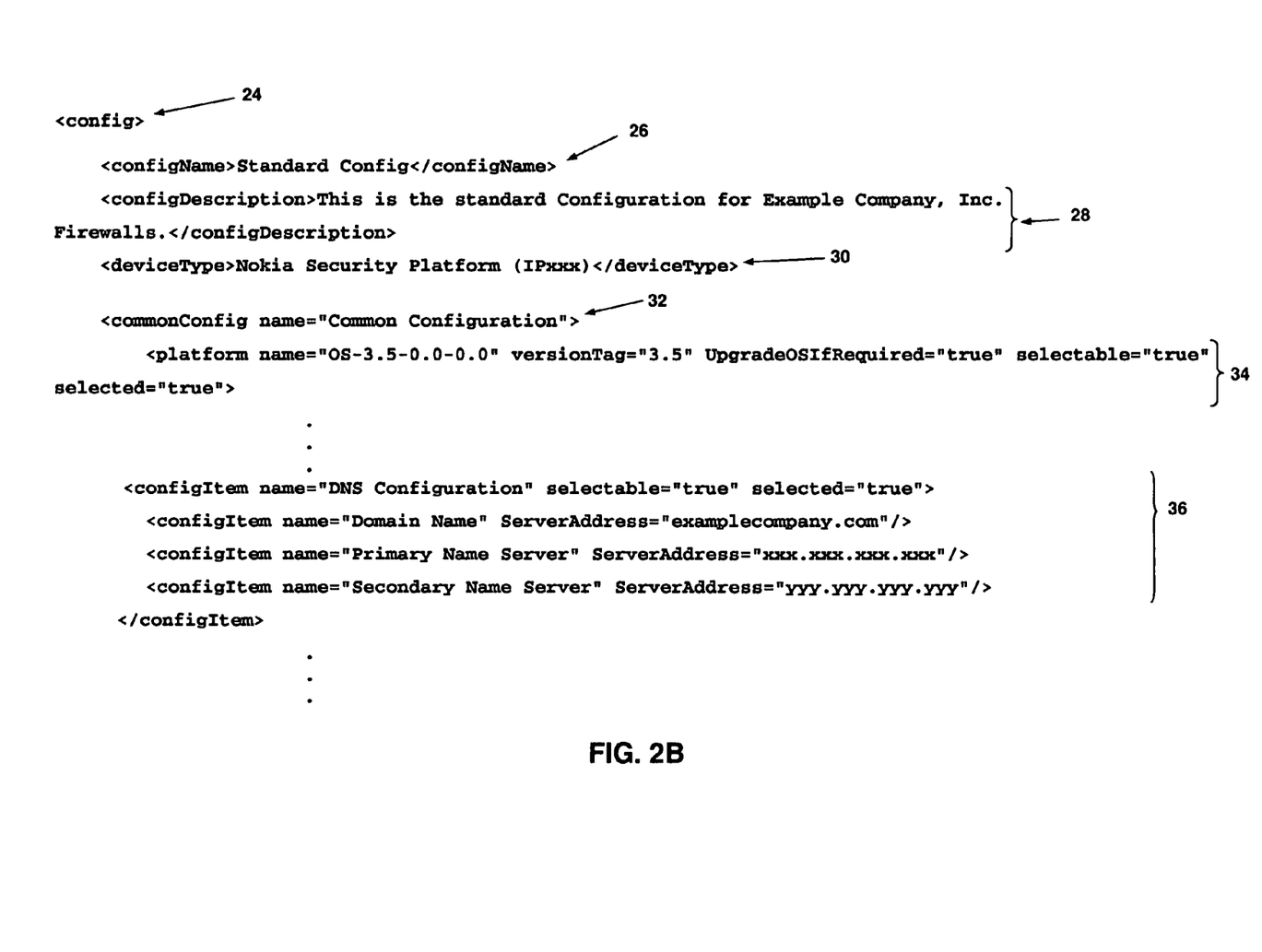
FIG. 2B is an illustration of a portion of an example standard configuration file in XML format.
Figure 2C:
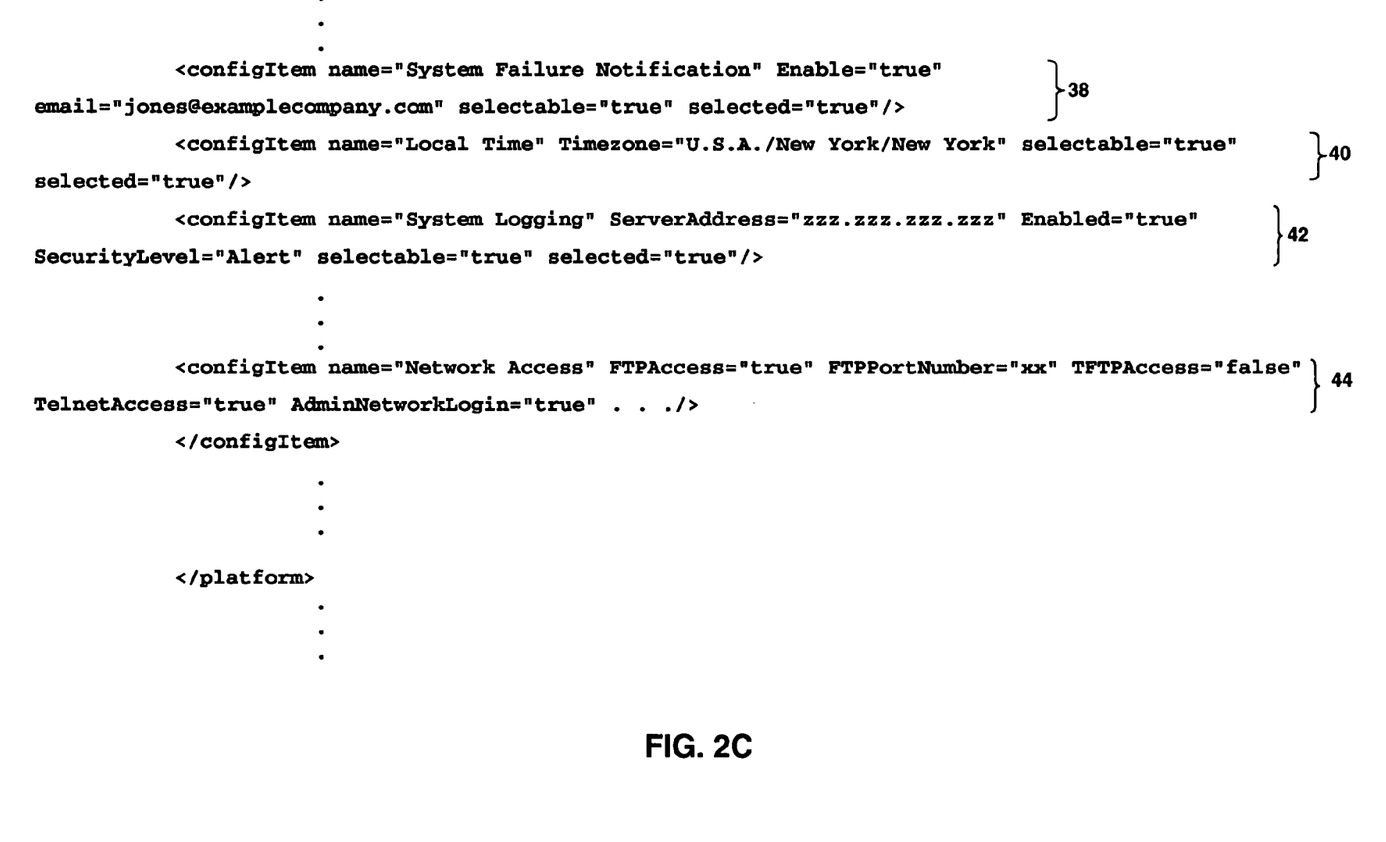
FIG. 2C is a continuation of the example configuration file from FIG. 2B.
Figure 2D:
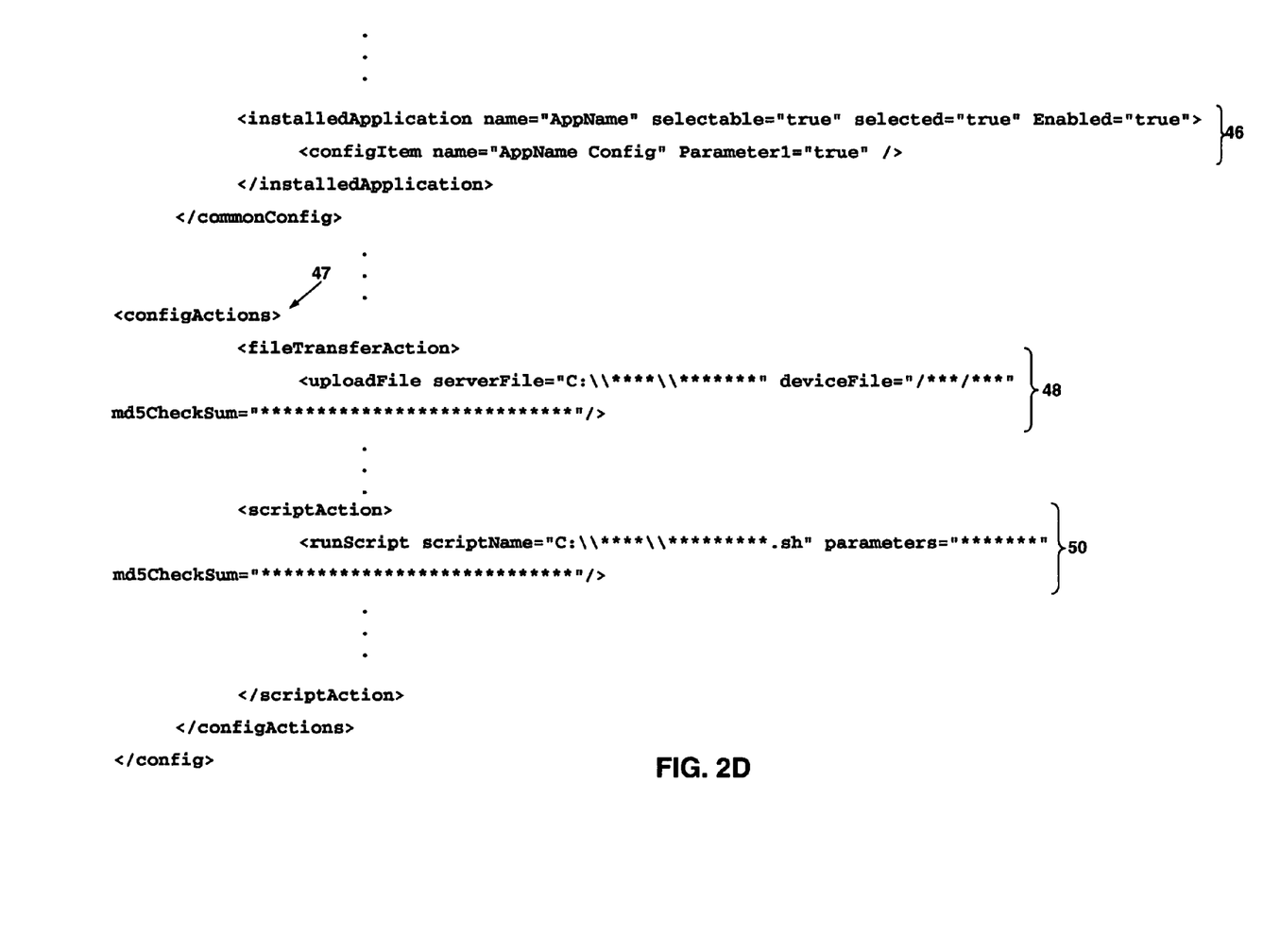
FIG. 2D is a continuation of the example configuration file from FIG. 2C.

FIGS. 2B-2D are annotated portions of an example configuration file in XML format, such as configuration file 22. The portions shown merely illustrate the types of configuration profile data and other information which such a configuration file might contain. Other configuration files would not necessarily have all information shown in FIGS. 2B-2D, and may contain other information. Other configuration files might be arranged differently, may use different XML tags, and may be written in a format other than XML. Tag 24 marks the beginning of the "config" element which forms the configuration file. Elements 26 ("configName") and 28 ("configDescription") provide additional identifying information about the specific configuration profile, including the name for the configuration profile ("Standard Config") and a description of the configuration profile (in the example, a standard configuration for Example Company, Inc. firewalls). Element 30 ("deviceType") identifies the type of hardware for which the configuration profile is intended. Tag 32 begins the "commonConfig" element. In the example, this element includes software settings that would be the same across a group of network control devices such as devices 12 in network 1. Tag 34 begins the "platform" element, and includes various attribute/value pairs (e.g., "name="OS-3.5-0.0-0.0"") that identify the operating system software that is used in the configuration profile of the example. In other words, a device operating under this particular profile will have version 3.5-0.0-0.0 of the "OS" operating system. Moreover, a device operating under this configuration profile would be configured to accept future upgrades of its operating system ("UpgradeOSIfRequired="true"").

Elements 36 contain configuration data for the Domain Name Server (DNS) used by a device 12. Element 38 contains data for configuring internal system failure routines within a device, such as identifying where e-mail error messages should be sent. In the example, a device operating with this configuration profile will send an e-mail to "jones@examplecompany.com" in the event of a system failure. Element 40 contains data to configure the local time used by a device, and element 42 contains configuration information for various system logging and security features of a device. Element 44 includes configuration data for File Transfer Protocol (FTP) and Telnet communications. Element 46 includes configuration data for application programs that may be installed upon a device. As part of the example, a device operating under this configuration profile will have an application program known as "AppName," and "parameter1" of AppName will be set to "true."

Tag 47 marks the beginning of a "configActions" element. This element may be used to identify miscellaneous actions that might be carried out in connection with (or on completion of) configuring a device. For example, "fileTransferAction" element 48 can be used to cause upload of a file to a device from a server. Element 50 ("scriptAction") includes data identifying various script files (or batch files) that a device might run, where those script files are located, and various parameters for those scripts. An "executeCommand" element (not shown) could be used to cause a device to execute a single command.

The various elements and attribute/value pairs in FIGS. 2B-2D are only examples, and numerous other types of data could be contained in a configuration file such as configuration file 22. Other examples include, but are not limited to: static entries for routing tables; mail server IP address; various security scripts, commands and files; enablement of Secure Shell (SSH), Secure Socket Layer (SSL) and other secure connections, and parameters for same; limitations on number of authenticated connections; access rights; time-out periods; log-in grace periods; etc. As indicated above, and in addition to specified settings for software parameters, a particular configuration profile may also require that a device have a particular operating system (or version thereof) and particular application software (or version(s) thereof). The XML language shown is but one possible example; the syntax could be varied. Similarly, a configuration file need not be in XML format, or in any other particular format. Any format which provides sufficient meta-data about device parameters may be used.

Within FIGS. 2B-2D, various IP addresses are indicated with letters (e.g., "xxx.xxx.xxx.xxx"). This is for purposes of illustration only; in reality, valid IP addresses having numbers would be used. Similarly, the asterisks within elements 48 and 50 are only for purposes of illustration, and represent numerous other possible values that might be used. Other example information within FIGS. 2B-2D (e.g., example domain name, example software, etc.) is also for purposes of illustration, and is not intended as a limitation on the invention.

Configuration file 22 (FIG. 2A) is stored and made accessible to network management software 20. Multiple configuration files may be prepared and stored so as to reflect different configurations. These different configurations may address a need to have different configuration settings for different geographic regions (e.g., one group of devices may be configured to send error reports to a system administrator in one city, while another group of devices may be configured to send error reports to another system administrator located in a different city). Different configurations might also be necessary to address differences among the hardware and software on individual devices.

Figure 3:
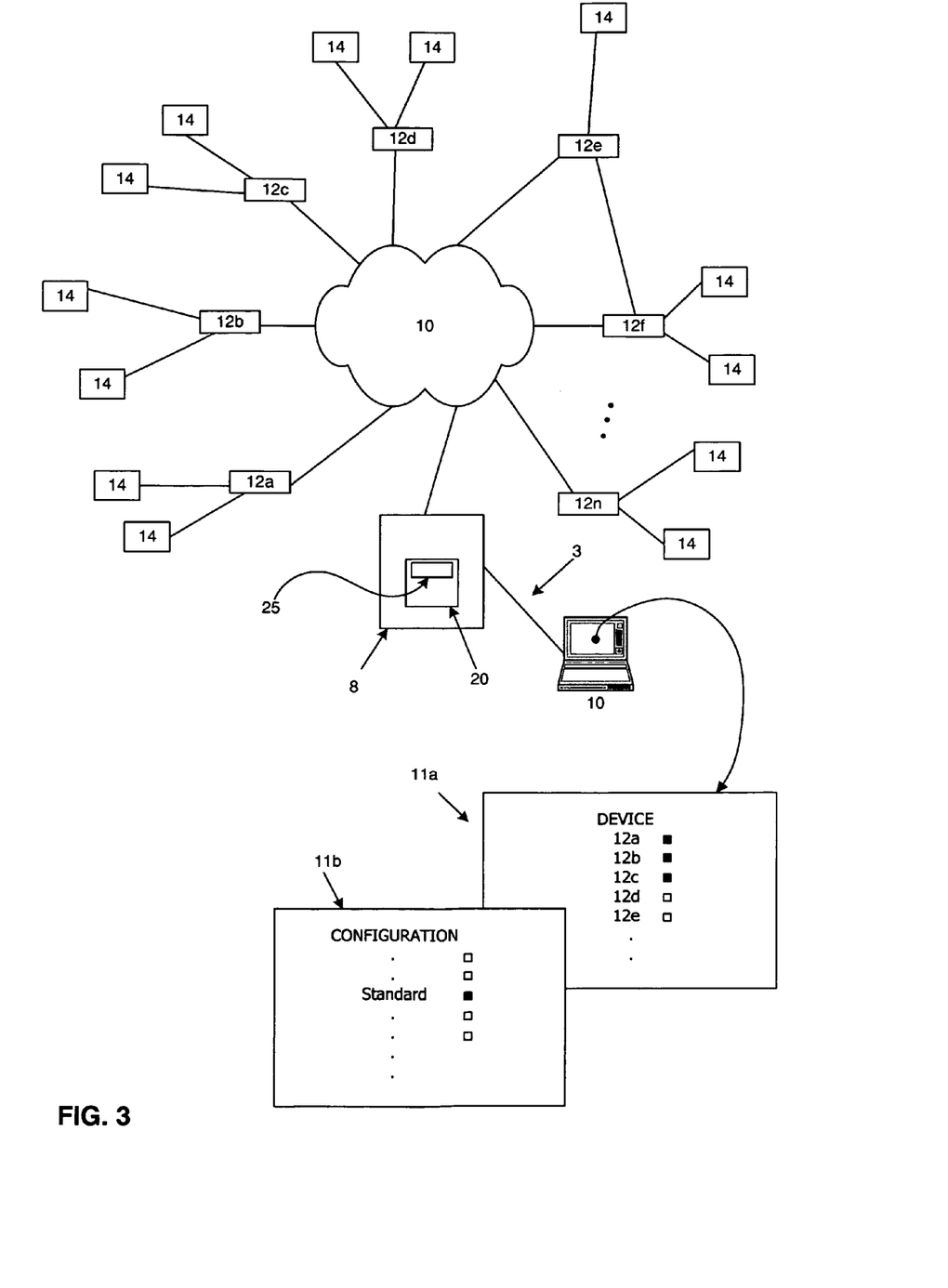
FIG. 3 is a block diagram showing, according to one embodiment of the invention, initiation of a configuration deployment among multiple devices in a network.
Figure 4:
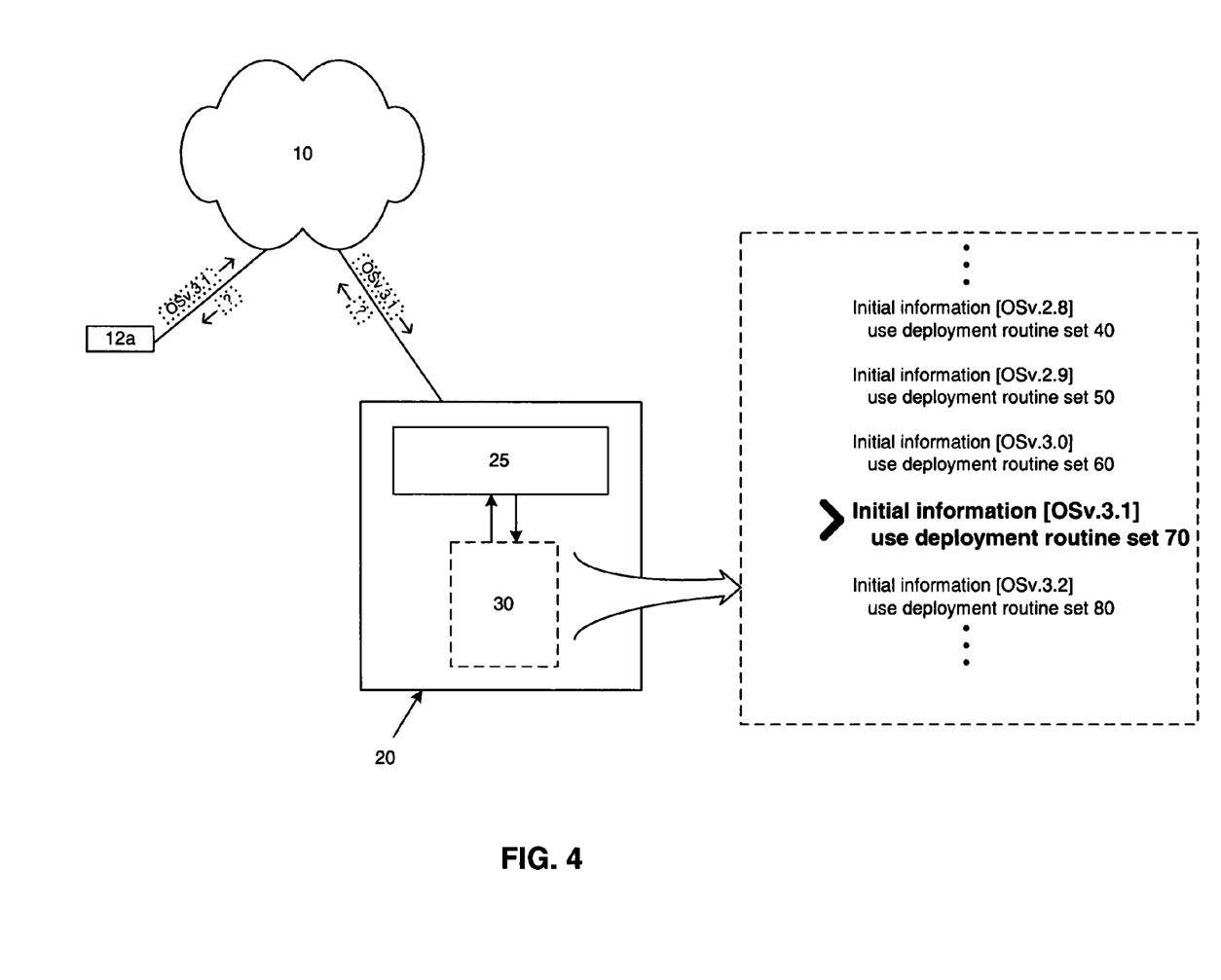
FIG. 4 is a block diagram showing retrieval of initial identifying data from a device and mapping the data to an appropriate deployment routine set.
Figure 5:
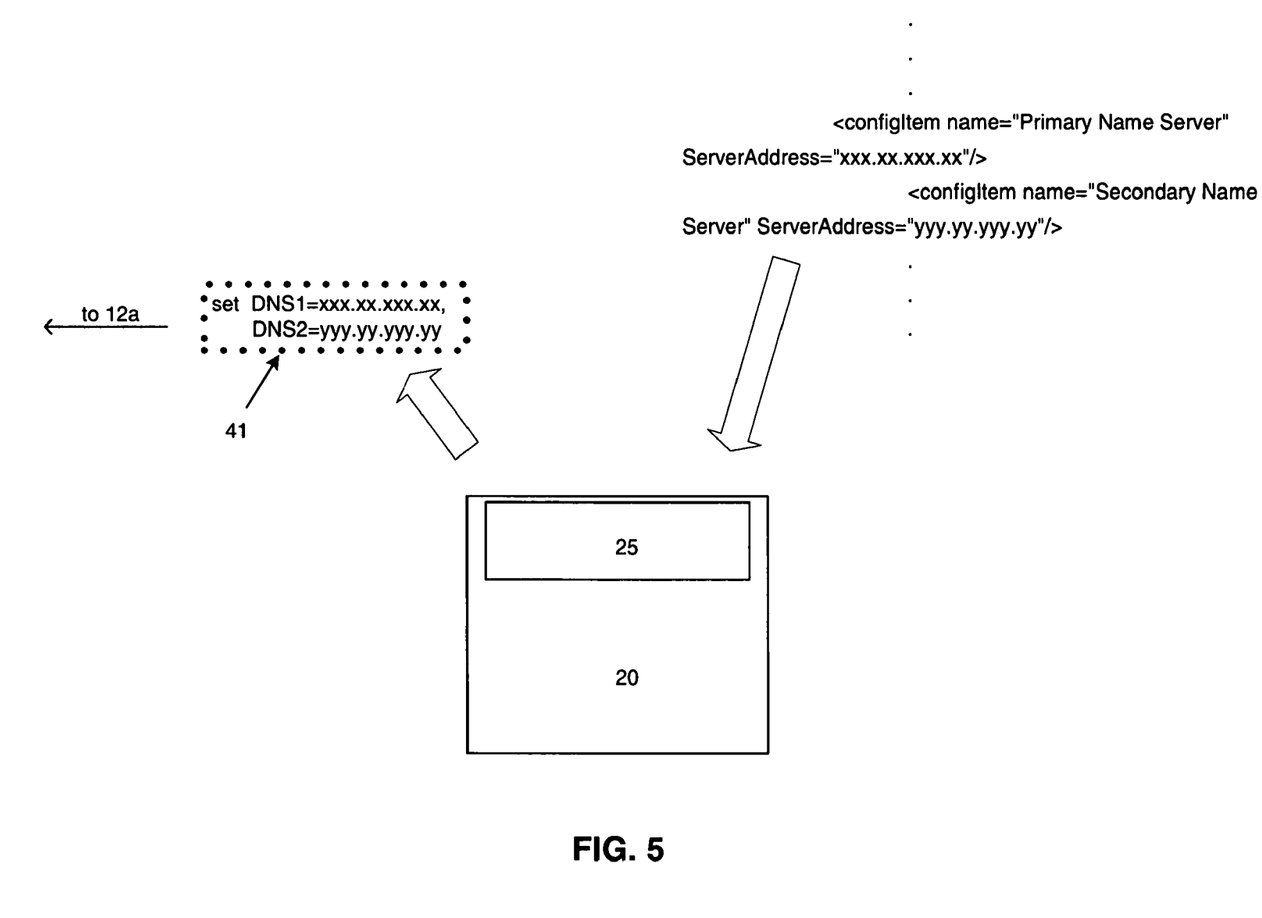
FIG. 5 is a block diagram showing, according to one embodiment of the invention, translation of configuration data from an XML configuration file into a device-specific command and transmission of the command to a device.

FIGS. 3-5 show how configuration file 22 (or another configuration file) may be used in one embodiment of the invention to configure multiple devices 12 in network 1. As shown in FIG. 3, a network administrator uses management client 10 to access configuration deployment software 25 on host 8. Using deployment software 25 (which may be part of network management software 20, or may be a separate application), the administrator identifies the device(s) to be configured and the configuration profile(s) to be deployed on these devices. As shown in FIG. 3, the administrator may be presented with one or more screens 11*a* that permit the administrator to select the devices to be configured. Screen 11*a* may be in the format of a spreadsheet or in any other Graphical User Interface (GUI) or other format. The administrator might then be presented with one or more screens 11*b* that allow the administrator to choose from configuration profiles. These choices could also be presented to the administrator in a Graphical User Interface (GUI) or other format, and the administrator may have various other configuration options. For example, the administrator may be able to expand a particular profile, and choose which of the individual settings within the profile will be deployed. Although only 3 devices 12 (12*a*, 12*b* and 12*c*) are marked for configuration in FIG. 3, any number of devices (1000 or more) could be configured. Each of the deployable configuration profiles are stored as separate configuration files (such as configuration file 22 in FIG. 2A).

Once the administrator identifies the devices to be configured and the configuration(s) to be deployed, deployment software 25 opens a network connection with each device 12. In one preferred embodiment, deployment software 25 may simultaneously open connections to multiple devices on multiple programming threads. As shown in FIG. 4, deployment software 25 initially queries each device 12 for identifying information, such as the version of the operating system software installed on the device; other initial identifying information (such as the identity of application software loaded on the device) could be obtained. Deployment software 25 then consults a file 30 (which may also be in XML format) which maps the initial identifying information from a device with a set of configuration deployment routines or procedures that correspond to the initial identifying information obtained from that device. File 30 may be separately prepared, and may reference numerous deployment routine sets that are developed to deal with differences among various devices' hardware or software. As used herein, "routine set" generically refers to a collection of programming instructions and/or data that convert some or all of the configuration data (stored in a configuration file) into device-specific commands for configuring a device having a particular combination of pre-existing settings (e.g., for a particular operating system version, for a particular operating system version and certain combination of application software, for a particular type of hardware, etc.). Such a routine set could address, for example, specific command syntax or format requirements for a particular operating system version. In a preferred embodiment, each unique combination of initial identifying information for a device corresponds to a different Java® programming language class. The Java® class is loaded using the "reflection" API and instantiated; each class would have "set" methods to convert configuration data (from an XML configuration file) into device-specific commands to configure a device.

As shown in FIG. 4, device 12*a* transmits a message indicating that it has version 3.1 of the operating system ("OSv.3.1"). Deployment software 25 then searches file 30 for the corresponding deployment routine set, and identifies "deployment routine set 70." Deployment software 25 then loads that deployment routine set. Various routines within that deployment routine set then translate the configuration data in the configuration file corresponding to the selected configuration profile into one or more device-specific commands. If, for example, a particular command to set a parameter has changed from OS version 3.0 to OS version 3.1, deployment routine set 70 would be able to generate the correct command for device 12*a*. If device 12*a* instead had OS version 3.0, another deployment routine set would be chosen. As part of deploying the selected configuration profile, deployment software 25 may also upgrade the operating system or application software on device 12*a*. New software might also be loaded. For example, the configuration profile set forth in the sample file of FIGS. 2B-2D requires that OS version 3.5 be installed. However, and as reflected in FIG. 4, device 12*a* currently has OS version 3.1. In order to fully deploy the configuration profile, OS version 3.5 must be downloaded and installed on device 12*a*. Accordingly, deployment routine set 70 could generate the appropriate command(s) to download and install the new version on device 12*a*.

FIG. 5 further illustrates deployment of certain configuration parameters from an XML configuration file to device 12*a*. Reading server address information from a "configItem" element, deployment software 25 generates an appropriate command 41 to device 12*a* to set the DNS configuration, and transmits the command 41 over a still-open network connection to device 12*a*. Device 12*a* may send a confirming message acknowledging the configuration change. Upon receiving the acknowledgement, deployment software 25 may then generate another command to change other parameters, and the procedure may continue until all parameters have been set.

In a preferred embodiment, configuration profile deployment is executed so as to set individual configuration parameters one at a time. In this manner, more fine-grained error handling is possible if a particular configuration command fails. Alternatively, deployment software 25 may convert the configuration file into a script file containing a sequence of commands to set multiple individual configuration parameters, and download the script upon a device 12 for batch execution of those commands. For example, if the configuration file is in XML format, the XML file can be transformed (via an Extensible Stylesheet Language Transformation (XSLT)) into a configuration script that is specific to the operating system and/or application(s) loaded on a particular device. A separate script can be generated for each device. Each script can then be downloaded to its target device. Each target device can then execute its script.

Figure 6A:
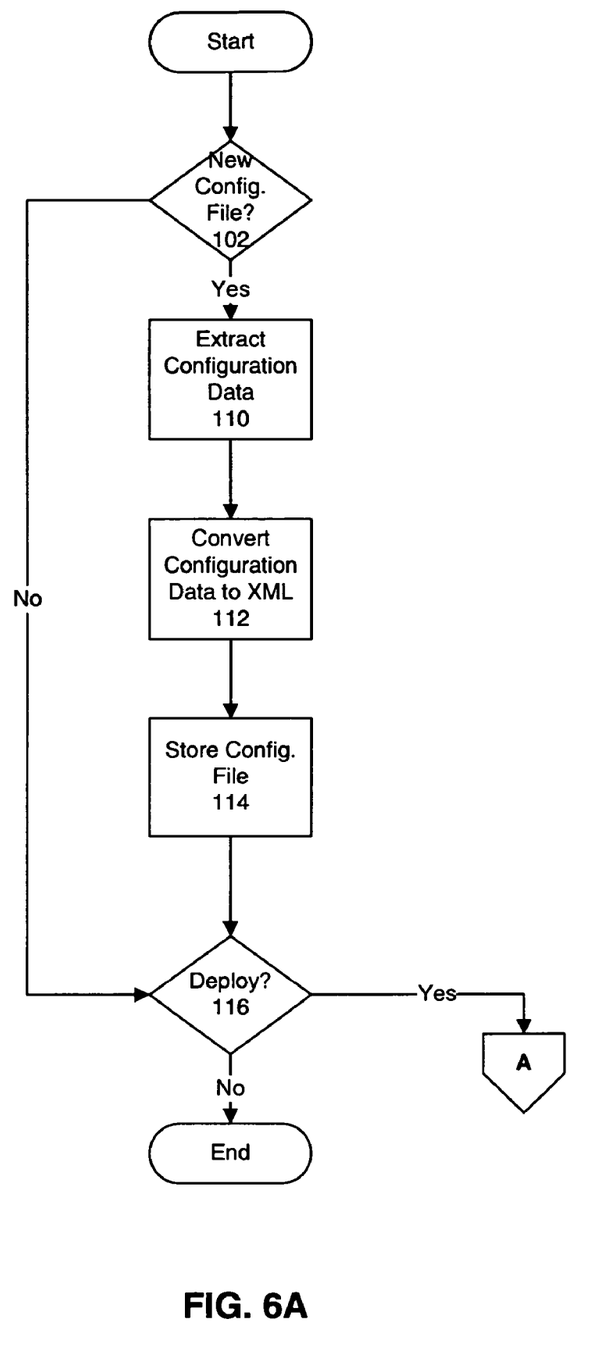
FIGS. 6A-6C are flow charts showing operation of various embodiments of the invention.
Figure 6B:
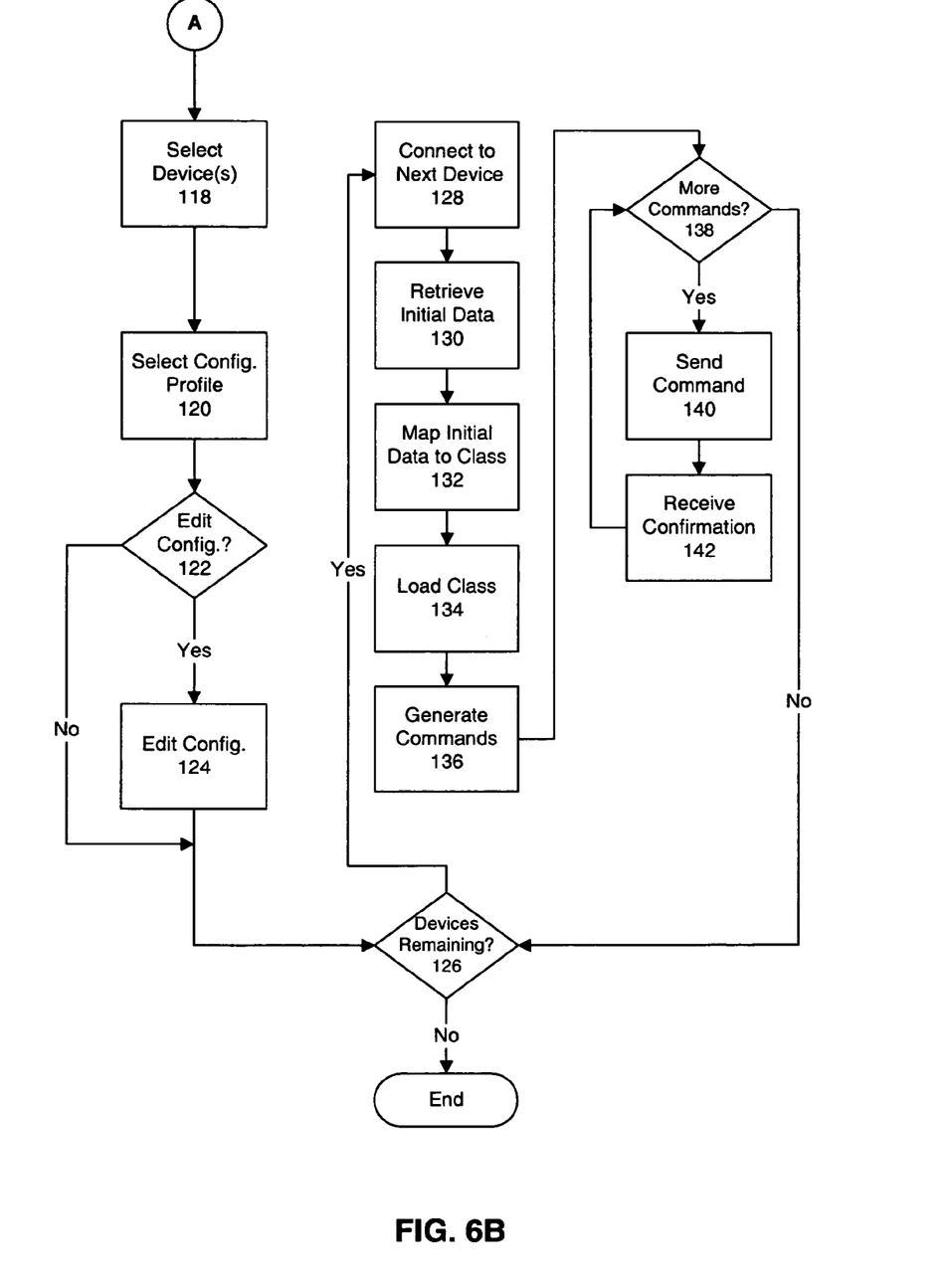

FIGS. 6A and 6B are flowcharts illustrating operation of a process according to one embodiment of the invention. The process may start with a determination of whether a new configuration file must be generated (decision block 102). If so, configuration data from a configured device (such as, e.g., device 12' described above) is extracted at block 110. At block 112, the extracted configuration data is converted into an XML file, which is then stored at block 114. The extraction (block 110) and conversion (block 112) may occur as described above with regard to FIG. 2A. At block 116, a determination is made as to whether a configuration profile will be deployed. If no, the process terminates. Otherwise, the process continues, via connector A, to steps shown in FIG. 6B. If a new configuration file is not to be created, execution proceeds directly from block 102 to decision block 116.

If a configuration profile is to be deployed, the devices to be configured are first selected at block 118. Next, the configuration profile is selected at block 120. At block 122, an opportunity is provided to edit the configuration. In one alternative, actual changes to the configuration file(s) for the profile are made (i.e., the actual file is modified). In another alternative, the profile changes could be temporarily stored and later used to modify execution of a deployment routine. Either of these alternatives (or other alternatives) could be provided to a user via a GUI that allows expansion of a chosen profile and selection/deselection of individual configuration parameters. The configuration profile can thus be modified without physically reconfiguring a device (such as device 12') and re-extracting the configuration data. If, for example, an IP address for a server changes subsequent to initial creation of the configuration file, the configuration file can be opened and the appropriate IP address changed. In a preferred embodiment, the configuration file is in XML format, and can be edited using various commercially-available XML editors, or with a simple text editor.

If it is decided to edit the configuration, changes are made at block 124. If configuration editing was not desired at block 122, the process would omit block 124.

A determination is then made at block 126 regarding whether there are any selected devices remaining to be configured. If so, a connection to the next device to be configured is created at step 128. In a preferred embodiment, this connection is made via secure shell (SSH) or other secure connection. After connecting to the device, initial identifying data (such as, e.g., operating system version and application software present) is retrieved at block 130. The initial identifying data is then mapped to a Java® class (or other deployment routine set) at block 132. The class (or other routine set) is then loaded at block 134. Device specific commands are then generated at block 136 based on the deployment routine set, the configuration file for the selected configuration profile, and any edits to (or other changes from) the information in the configuration file.

At block 138, a determination is made regarding whether any of the commands (created at block 136) remain to be sent to the device. If so, the next command is sent at block 140. In a preferred embodiment, the commands are ordered so as to first install a new operating system (or operating system version) if required, to then install any new application software (or version), to then enable/disable features of the new software, and to then set other configuration parameters. At block 142, an acknowledgement or other confirmation is received from the device that the command has been executed. This confirmation may either be automatic, or may result from commands sent from the deployment software (as part of step 140) to confirm execution of a deployment command. After confirmation of a deployment command, execution returns to block 138. If additional deployment commands remain, the loop continues until all commands have been transmitted and confirmed. If no deployment commands remain, the process returns to block 126, and the next device is configured. If there are no devices remaining for configuration at block 126, the process terminates.

Figure 6C:
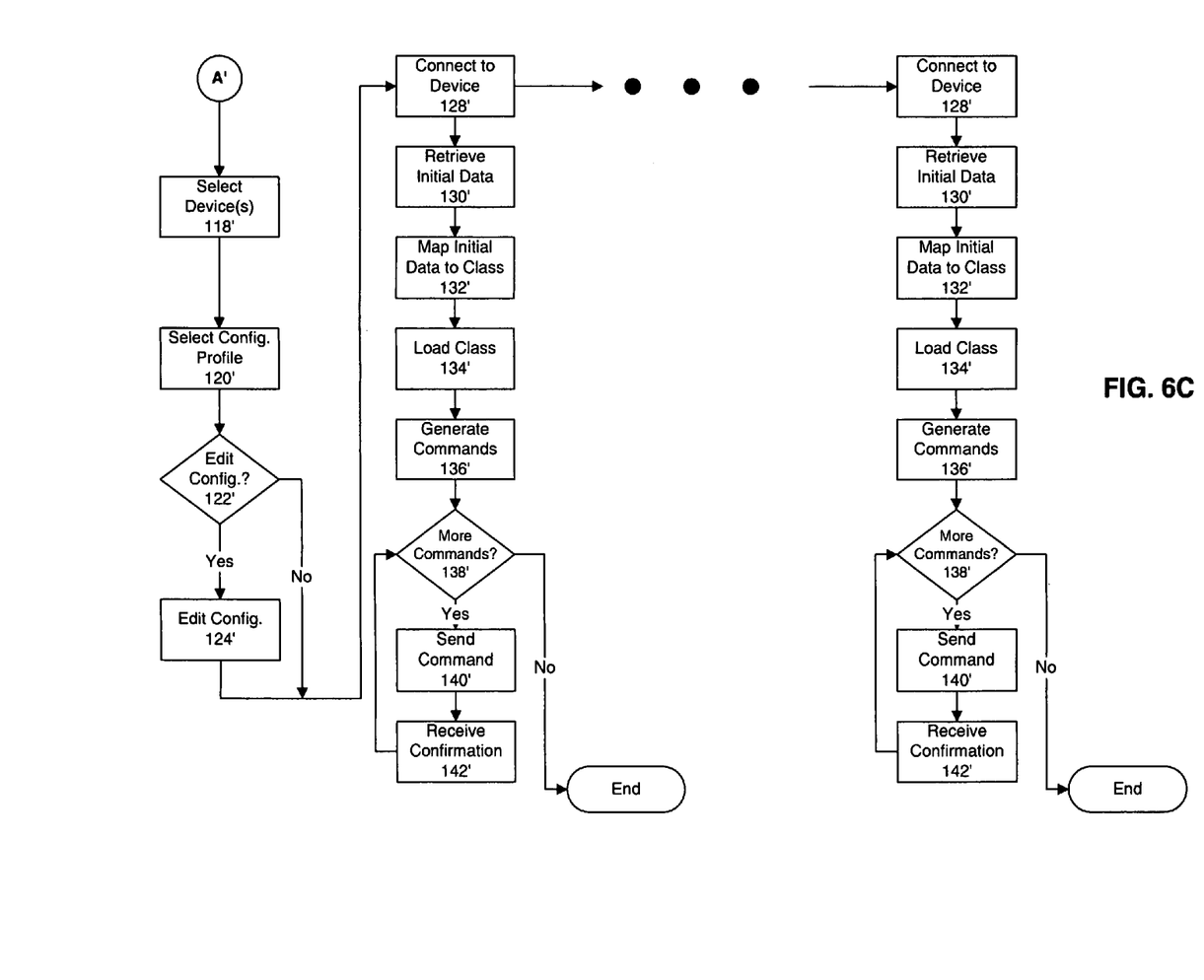

FIG. 6C shows an alternative to the process shown in FIG. 6B. The steps 118', 120', 122' and 124' are substantially the same as in FIG. 6B. However, the process in FIG. 6C has been slightly modified so that multiple devices are simultaneously configured on multiple programming threads. Steps 130', 132', 134', 136', 138', 140' and 142' are substantially the same as steps 130-142 in FIG. 6B, but are performed in parallel for multiple devices.

Although specific examples of carrying out the invention have been described, those skilled in the art will appreciate there are numerous variations and permutations of the above-described systems and methods that are involved in the spirit and scope of the invention as set forth in the appended claims. For example, a machine-readable medium could have machine-executable instructions stored thereon such that, when the instructions are read and executed by an appropriate device (or devices), steps of a method according to the invention are performed. As indicated above, other formats in addition to, or instead of, XML may be implemented. Similarly, various programming languages may be used. The various procedures and steps discussed above may be rearranged and their performance distributed across multiple hardware platforms and software applications. These and other modifications are within the scope of the invention as defined in the attached claims.

I claim:

1. A method, comprising:
   receiving a selection of a group of devices in a data communication network to be configured in accordance with a previously-stored common configuration profile, the devices of the group being situated in different locations within the data communications network, the common configuration profile having previously-stored configuration data that specifies, as to each device of the group, values for multiple configuration parameters corresponding to desired operation of that device;
   automatically opening a network connection with each of the devices of the group;
   automatically retrieving identifying data from each of the devices of the group;
   automatically mapping, for each device of the group and subsequent to receiving the selection, the retrieved identifying data to a corresponding one of multiple configuration profile deployment routine sets, wherein
      the retrieved identifying data of each device corresponds to a different configuration profile deployment routine set, and
      each configuration profile deployment routine set includes programming instructions to convert the configuration data from the common configuration profile into device-specific commands to configure the device having the corresponding retrieved identifying data;
   automatically generating device-specific commands for each device of the group, wherein the device-specific commands for each device are generated subsequent to the automatic mapping for that device and are generated using the previously-stored configuration data of the common configuration profile and the configuration profile deployment routine set corresponding to the identifying data for that device; and
   automatically transmitting the device-specific commands to each device of the group.

2. The method of claim 1, wherein automatically retrieving identifying data comprises retrieving data regarding software installed on each device of the group, and wherein each of the corresponding configuration deployment routine sets is specific to a type of installed software.

3. The method of claim 1, wherein automatically retrieving identifying data comprises retrieving data regarding a device type of each device of the group, and wherein the each of the corresponding configuration deployment routine sets is specific to a device type.

4. The method of claim 1, further comprising preparing a script file for each device of the group, each of the script files allowing batch execution of the device-specific commands for the device for which that script file was prepared, and wherein automatically transmitting the device-specific commands comprises transmitting the script files to the devices of the group.

5. The method of claim 1, wherein automatically transmitting the device-specific commands comprises, as to each device of the group:
   transmitting a first command to the device;
   receiving an acknowledgement of successful execution of the first command by the device; and
   transmitting a second command to the device upon receiving the acknowledgement.

6. The method of claim 1, wherein:
   automatically opening a network connection further comprises establishing a secure network connection to each device of the group,
   the previously-stored common configuration profile includes previously-stored configuration data specifying multiple configuration parameters for network security devices,
   automatically retrieving identifying data comprises retrieving data from each device of the group over the secure network connections, and
   automatically transmitting the device-specific commands comprises transmitting the device-specific commands over the secure network connections.

7. The method of claim 1, wherein:
   the previously-stored common configuration profile specifies operating system software to be used by each device of the group,
   automatically generating device-specific commands comprises generating commands to install the specified operating system software on at least one device of the group, and
   automatically transmitting the device-specific commands comprises installing the specified operating system software on the at least one device.

8. The method of claim 1, wherein:
   the previously-stored common configuration profile specifies application software to be used by each device of the group,
   automatically generating device-specific commands comprises generating commands to install the specified application software on at least one device of the group, and
   automatically transmitting the device-specific commands comprises installing the specified application software on the at least one device.

9. The method of claim 1, further comprising selecting the previously-stored common configuration profile from a plurality of previously-stored configuration profiles.

10. The method of claim 1, further comprising:
    selecting individual configuration parameters from the previously-stored common configuration profile; and
    modifying the selected individual configuration parameters.

11. A machine-readable medium having machine-executable instructions for performing a method comprising:
    receiving a selection of a group of devices in a data communication network to be configured in accordance with a previously-stored common configuration profile, the devices of the group being situated in different locations within the data communications network, the common configuration profile having previously-stored configuration data that specifies, as to each device of the group, values for multiple configuration parameters corresponding to desired operation of that device;
    automatically opening a network connection with each of the devices of the group;
    automatically retrieving identifying data from each of the devices of the group;

automatically mapping, for each device of the group and subsequent to receiving a selection, the retrieved identifying data to a corresponding one of multiple configuration profile deployment routine sets, wherein
the retrieved identifying data of each device corresponds to a different configuration profile deployment routine set, and
each configuration profile deployment routine set includes programming instructions to convert the configuration data from the common configuration profile into device-specific commands to configure the device having the corresponding retrieved identifying data;
automatically generating device-specific commands for each device of the group, wherein the device-specific commands for each device are generated subsequent to the automatic mapping for that device and are generated using the previously-stored configuration data of the common configuration profile and the configuration profile deployment routine set corresponding to the identifying data for that device; and
automatically transmitting the device-specific commands to each device of the group.

12. The machine-readable medium of claim 11, wherein automatically retrieving identifying data comprises retrieving data regarding software installed on each device of the group, and wherein each of the corresponding configuration deployment routine sets is specific to a type of installed software.

13. The machine-readable medium of claim 11, comprising farther machine-executable instructions for preparing a script file for each device of the group, each of the script files allowing batch execution of the device-specific commands for the device for which that script file was prepared, and wherein automatically transmitting the device-specific commands comprises transmitting the script files to the devices of the group.

14. The machine-readable medium of claim 11, wherein automatically transmitting the device-specific commands comprises, as to each device of the group:
transmitting a first command to the device;
receiving an acknowledgement of successful execution of the first command by the device; and
transmitting a second command to the device upon receiving the acknowledgement.

15. The machine-readable medium of claim 11, wherein:
automatically opening a network connection further comprises establishing a secure network connection to each device of the group,
the previously-stored common configuration profile includes previously-stored configuration data specifying multiple configuration parameters for network security devices,
automatically retrieving identifying data comprises retrieving data from each device of the group over the secure network connections, and
automatically transmitting the device-specific commands comprises transmitting the device-specific commands over the secure network connections.

16. The machine-readable medium of claim 11, wherein:
the previously-stored common configuration profile specifies operating system software to be used by each device of the group,
automatically generating device-specific commands comprises generating commands to install the specified operating system software on at least one device of the group, and automatically transmitting the device-specific commands comprises installing the specified operating system software on the at least one device.

17. The machine-readable medium of claim 11, wherein:
the previously-stored common configuration profile specifies application software to be used by each device of the group,
automatically generating device-specific commands comprises generating commands to install the specified application software on at least one device of the group, and
automatically transmitting the device-specific commands comprises installing the specified application software on the at least one device.

18. The machine-readable medium of claim 11, comprising further machine-executable instructions for receiving the selection of a previously-stored common configuration profile from a plurality of previously-stored configuration profiles.

19. The machine-readable medium of claim 11, comprising further machine-executable instructions for:
receiving selections of individual configuration parameters from the previously-stored common configuration profile; and
receiving instructions to modify the selected individual configuration parameters.

20. An apparatus, comprising: a processor programmed to configure multiple network control devices by
receiving a selection of a group of devices to be configured in accordance with a previously-stored common configuration profile, the devices of the group being situated in different locations within the network, the common configuration profile having previously-stored configuration data that specifies, as to each device of the group, values for multiple configuration parameters corresponding to desired operation of that device,
automatically opening a network connection with each of the devices of the group,
automatically retrieving identifying data from each of the devices of the group,
automatically mapping, for each device of the group and subsequent to receiving a selection, the retrieved identifying data to a corresponding one of multiple configuration profile deployment routine sets, wherein
the retrieved identifying data of each device corresponds to a different configuration profile deployment routine set, and
each configuration profile deployment routine set includes programming instructions to convert the configuration data from the common configuration profile into device-specific commands to configure the device having the corresponding retrieved identifying data,
automatically generating device-specific commands for each device of the group, wherein the device-specific commands for each device are generated subsequent to performance of the automatic mapping for that device and are generated using the previously-stored configuration data of the common configuration profile and the configuration profile deployment routine set corresponding to the identifying data for that device, and
automatically transmitting the device-specific commands to each device of the group.

21. The apparatus of claim 20, wherein the processor is programmed to:

automatically retrieve identifying data by retrieving data regarding software installed on each device of the group, and wherein each of the corresponding configuration deployment routine sets is specific to a type of installed software.

22. The apparatus of claim 20 wherein the processor is programmed to prepare a script file for each device of the group, each of the script files allowing batch execution of the device-specific commands for the device for which that script file was prepared, and wherein automatically transmitting the device-specific commands comprises transmitting the script files to the devices of the group.

23. The apparatus of claim 20, wherein the processor is programmed to automatically transmit the device-specific commands, as to each device, by:

transmitting a first command to the device, receiving an acknowledgement of successful execution of the first command by the device, and transmitting a second command to the device upon receipt of the acknowledgement.

24. The apparatus of claim 20, wherein:

the processor is programmed to automatically open a network connection by a establishing secure network connection to each device of the group, the previously-stored common configuration profile includes previously-stored configuration data specifying multiple configuration parameters for network security devices, the processor is programmed to automatically retrieve identifying data by retrieving data from each device of the group over the secure network connections, and the processor is programmed to automatically transmit the device-specific commands by transmitting the device-specific commands over the secure network connections.

25. The apparatus of claim 20, wherein:

the previously-stored common configuration profile specifies operating system software to be used by each device of the group, and the processor is programmed to automatically generate device-specific commands by generating device-specific commands that include commands to install the specified operating system software on at least one device of the group.

26. The apparatus of claim 20, wherein:

the previously-stored common configuration profile specifies application software to be used by each device of the group, and the processor is programmed to automatically generate device-specific commands by generating device-specific commands that include commands to install the specified application software on at least one device of the group.

27. The apparatus of claim 20, wherein the processor is programmed to receive the selection of the common configuration profile from a plurality of previously-stored configuration profiles.

28. The apparatus of claim 20, wherein the processor is further programmed to:

receive selections of individual configuration parameters from the previously-stored common configuration profile, and modify the selected individual configuration parameters.

* * * * *